(12) United States Patent
Anagnoson et al.

(10) Patent No.: US 10,789,219 B1
(45) Date of Patent: Sep. 29, 2020

(54) INSURANCE POLICY PROCESSING USING QUESTIONS SETS

(75) Inventors: Robert Theodore Anagnoson, San Mateo, CA (US); Ksenia Berger, San Francisco, CA (US); Howard Huang, Redwood City, CA (US)

(73) Assignee: Guidewire Software, Inc., San Mateo, CA (US)

( * ) Notice: Subject to any disclaimer, the term of this patent is extended or adjusted under 35 U.S.C. 154(b) by 301 days.

(21) Appl. No.: 13/432,840

(22) Filed: Mar. 28, 2012

(51) Int. Cl.
*G06F 16/21* (2019.01)

(52) U.S. Cl.
CPC .......... *G06F 16/211* (2019.01); *G06F 16/212* (2019.01)

(58) Field of Classification Search
USPC .......................................................... 705/4
See application file for complete search history.

(56) References Cited

U.S. PATENT DOCUMENTS

| | | | |
|---|---|---|---|
| 5,655,085 A | 8/1997 | Ryan et al. | |
| 5,752,236 A | 5/1998 | Sexton et al. | |
| 5,884,274 A | 3/1999 | Walker et al. | |
| 6,192,347 B1 | 2/2001 | Graff | |
| 6,895,409 B2 | 5/2005 | Uluakar et al. | |
| 7,124,088 B2 * | 10/2006 | Bauer | G06Q 10/10 705/4 |
| 7,333,939 B1 * | 2/2008 | Stender | G06Q 30/00 705/4 |
| 7,680,681 B2 | 3/2010 | Lotter et al. | |
| 7,698,158 B1 | 4/2010 | Flagg | |
| 7,711,584 B2 * | 5/2010 | Helitzer | G06Q 40/08 705/4 |
| 7,840,509 B1 * | 11/2010 | Messina | G06Q 50/10 706/45 |
| 7,885,831 B2 | 2/2011 | Burton et al. | |
| 8,027,983 B1 | 9/2011 | Nandy et al. | |
| 8,041,617 B1 | 10/2011 | Stender | |
| 8,200,511 B2 | 6/2012 | Zizzamia | |
| 8,392,222 B1 | 3/2013 | Seybold et al. | |
| 8,589,394 B2 | 11/2013 | Vignet | |
| 8,650,052 B1 | 2/2014 | Anagnoson | |
| 8,849,684 B1 | 9/2014 | Kilpatrick et al. | |

(Continued)

OTHER PUBLICATIONS

Boris Katz, Sue Felshin, Jimmy Lin, and Gregory Marton. Viewing the Web as a Virtual Database for Question Answering. In Mark T. Maybury, editor, New Directions in Question Answering. Cambridge, Massachusetts: MIT Press, 2004, pp. 215-226.*

(Continued)

*Primary Examiner* — Abhishek Vyas
(74) *Attorney, Agent, or Firm* — Van Pelt, Yi & James LLP

(57) ABSTRACT

Managing insurance policy configuration includes receiving information pertaining to an administrator-configured answer container configured to store answers to a set of administrator-configured questions and information pertaining to the administrator-configured question set. It further comprises establishing an association between the administrator-configured question set and the administrator-configured answer container; and establishing an association between a user interface context and the administrator-configured answer container, such that the set of administrator-configured questions are also associated with the user interface context.

22 Claims, 11 Drawing Sheets

(56) References Cited

U.S. PATENT DOCUMENTS

| | | | |
|---|---|---|---|
| 2002/0022976 A1* | 2/2002 | Hartigan | G06Q 40/08 705/4 |
| 2002/0035488 A1 | 3/2002 | Aquila et al. | |
| 2002/0046063 A1 | 4/2002 | Fujio | |
| 2002/0116231 A1 | 8/2002 | Hele et al. | |
| 2003/0018497 A1 | 1/2003 | Luedtke | |
| 2004/0143464 A1 | 7/2004 | Houle et al. | |
| 2004/0172310 A1 | 9/2004 | Atlee | |
| 2004/0225535 A1 | 11/2004 | Bond et al. | |
| 2005/0055249 A1 | 3/2005 | Helitzer et al. | |
| 2005/0216451 A1* | 9/2005 | Enzler | G06F 16/2438 |
| 2006/0047540 A1 | 3/2006 | Hutten | |
| 2006/0100912 A1 | 5/2006 | Kumar et al. | |
| 2006/0212469 A1 | 9/2006 | Babanov | |
| 2007/0156463 A1* | 7/2007 | Burton | G06Q 40/08 705/4 |
| 2007/0214020 A1 | 9/2007 | Srinivasan et al. | |
| 2008/0154651 A1 | 6/2008 | Kenefick et al. | |
| 2009/0006138 A1* | 1/2009 | Wait | G06Q 40/08 705/4 |
| 2009/0157433 A1 | 6/2009 | Schmidt et al. | |
| 2010/0070311 A1 | 3/2010 | Heydon | |
| 2011/0066454 A1 | 3/2011 | Rosauer et al. | |
| 2011/0288877 A1* | 11/2011 | Ofek | G06Q 10/10 705/2 |

OTHER PUBLICATIONS

C. Liu, D. Ju, Y. Gu, Y. Zhang, D. Wang and D. H. C. Du, "Semantic Data De-duplication for archival storage systems," 2008 13th Asia-Pacific Computer Systems Architecture Conference, Hsinchu, 2008, pp. 1-9. (Year: 2008).*

M. G. Elfeky, V. S. Verykios and A. K. Elmagarmid, "TAILOR: a record linkage toolbox," Proceedings 18th International Conference on Data Engineering, San Jose, CA, USA, 2002, pp. 17-28. (Year: 2002).*

"Data Pump Export", Oracle Database Utilities 10g Release 3; 1996.

* cited by examiner

INSURANCE POLICY PROCESSING USING QUESTIONS SETS

BACKGROUND OF THE INVENTION

Insurance policies are typically purchased by the customer (also referred to as the insured) through an insurance agent. During a purchase or renewal process, the insurance agent usually gathers information from the customer by asking the customer to fill out forms, which may include questionnaire sections for gathering specific information that can affect the terms of the policy. For example, a carrier about to underwrite a commercial property policy would be interested to know whether there are hazardous materials stored on the premise, whether the potentially insured is engaged in dangerous activities such as deep frying, etc. The information gathering process can be laborious, particularly for complex policies that cover multiple items. It is easy for the customer to miss questions, make mistakes on answers, etc. Further, it can be difficult for the insurance company to add new questions or modify existing questions.

Some attempts to automate the information gathering process have been made; however, since most existing automated systems also rely on the static configuration of questionnaires, adding or modifying questions can still be a labor intensive process. A more automated and more flexible way of gathering insurance related information by setting up questions is needed.

BRIEF DESCRIPTION OF THE DRAWINGS

Various embodiments of the invention are disclosed in the following detailed description and the accompanying drawings.

FIG. 11 shows the basic configuration options of a new question set.

FIG. 12 shows the basic configuration options for a question in the question set.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and system for managing insurance policy configuration is disclosed. In some embodiments, answer containers and question sets are configured by an administrator with privileges to make modifications to an insurance policy underwriting and administration platform. Associations between the administrator-configured question sets and the administrator-configured answer containers are established. In addition, associations between various user interface contexts and the administrator-configured answer containers are also established, such that the administrator-configured questions in the administrator-configured question sets are also associated with their respective user interface contexts. This way, appropriate questions are displayed when the corresponding user interface context is invoked. In some embodiments, actions to take in response to certain answers are also configurable.

Figure 1:
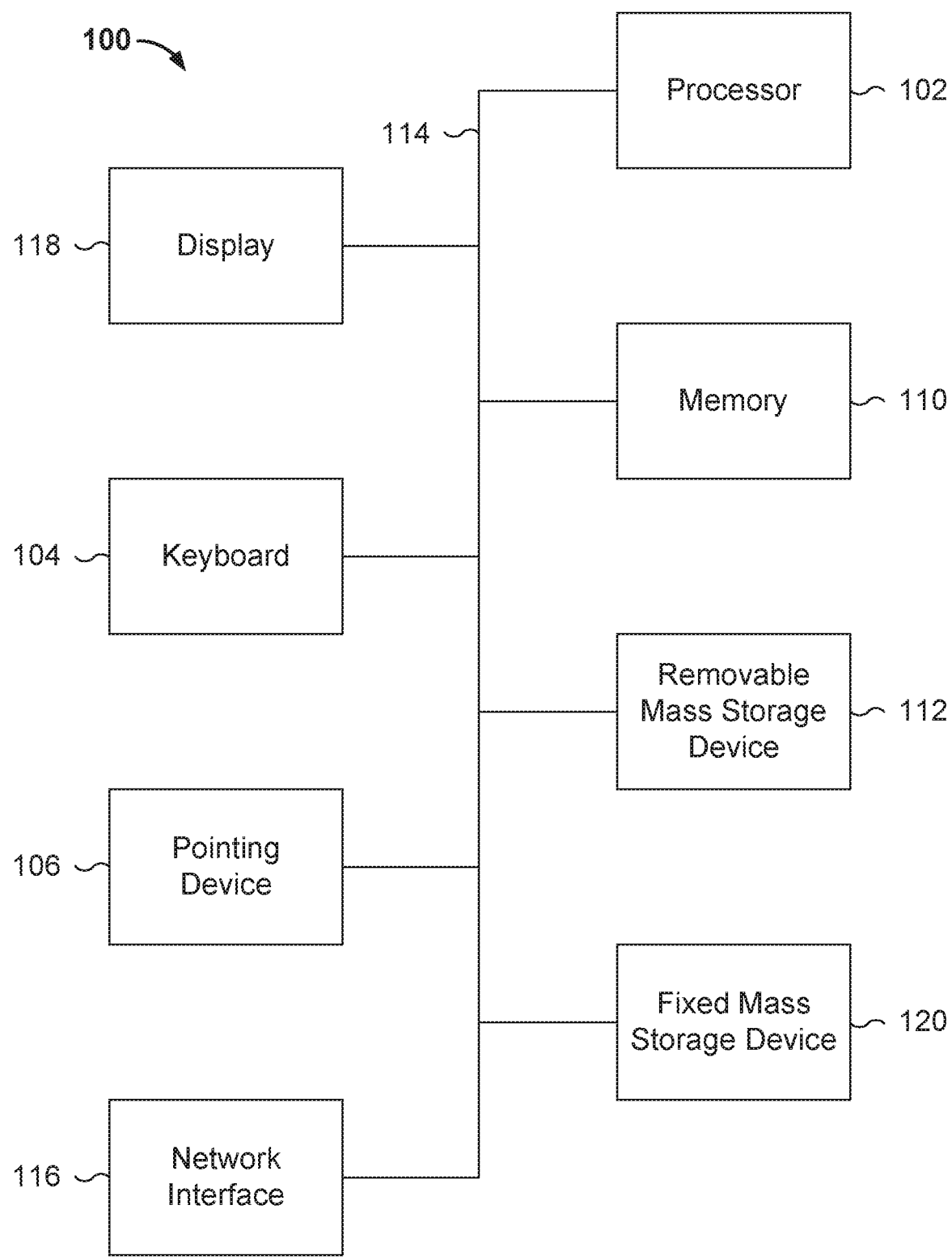
FIG. 1 is a functional diagram illustrating an embodiment of a programmed computer system for managing insurance policy configuration.

FIG. 1 is a functional diagram illustrating an embodiment of a programmed computer system for managing insurance policy configuration. As will be apparent, other computer system architectures and configurations can be used to manage insurance policy configuration. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to manage insurance policy configuration.

Processor 102 is coupled bi-directionally with memory 110, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100 and is coupled either bi-directionally (read/write) or uni-directionally (read only) to processor 102. For example, storage 112 can also include computer readable media such as magnetic tape, flash memory, PC-CARDS, portable mass storage devices, holographic storage devices, and other storage devices. A fixed mass storage 120 can also, for example, provide additional data storage capacity. The most common example of fixed mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a non-transitory computer readable medium that includes program code for performing various computer-implemented operations. The computer readable medium is any data storage device that can store data which can thereafter be read by a computer system. Examples of non-transitory computer readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
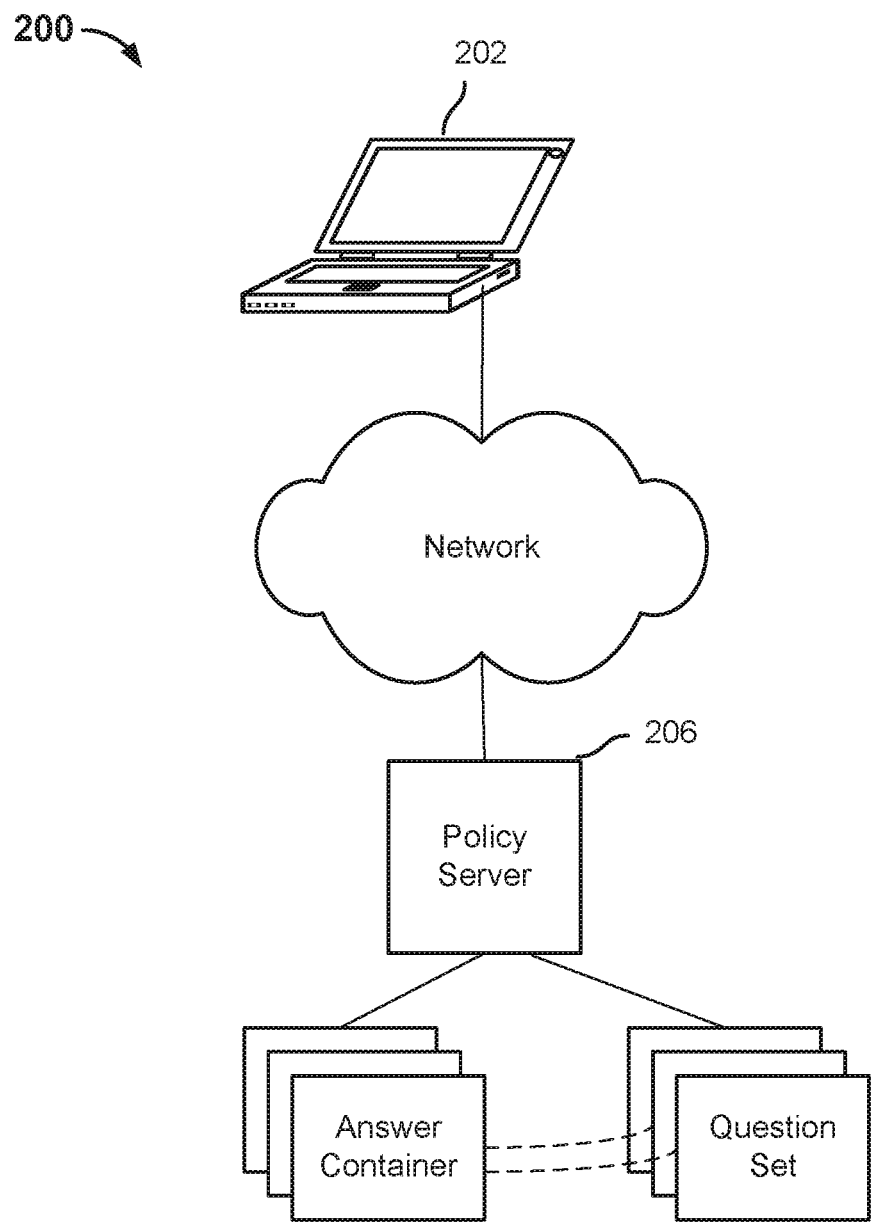
FIG. 2 is a system diagram illustrating an embodiment of a system for managing insurance policy configuration.

FIG. 2 is a system diagram illustrating an embodiment of a system for managing insurance policy configuration. In this example, policy server 206 is connected with one or more client devices such as 202 via a network. Server 206 may be implemented using one or more computing devices such as a computer, a multi-processor system, a microprocessor-based system, a special purpose device, a distributed computing environment including any of the foregoing systems or devices, or other appropriate hardware/software/firmware combination that includes one or more processors, and memory coupled to the processors and configured to provide the processors with instructions. Examples of client device 202 include a laptop computer, a desktop computer, a smart phone, a mobile device, a tablet device or any other computing device. In various embodiments, an application such as a web browser or a client application is installed at device 202 to provide user interfaces for users to interact with policy server 206. The policy server is optionally connected to other components such as databases and/or other servers. Various other configurations are possible.

Policy server 206 provides insurance policy configuration capabilities to insurance agents or potential customers (collectively referred to as end-users). The end-users, via user interfaces provided and supported by client device 202 and policy server 206, enter information about specific insurance products they are interested in and send the information to policy server 206. The policy server processes the information and performs various policy processing related actions such as providing quotes, issuing or updating the policy, etc.

A part of the policy information processing logic has to do with determining which questions should be presented to the end-user given a particular context. For example, depending on where the end-user is in the policy creation or update process, different questions are displayed; certain questions may only be available for certain types of policies or if the end-user enters certain information. The logic also determines what actions to take in response to certain answers. For example, the application process could be blocked if the answer to whether hazardous materials are stored at a property to be insured is yes. The logic and its associated data for presenting questions are collectively referred to as the policy questions processing module, which can be implemented in program code, configuration files, a combination thereof, or any other appropriate form. A special set of configuration code is implemented for modifying the policy questions processing module. Only certain super users (referred to as administrators) are given the privilege to access the policy questions processing module configuration code and modify the policy questions processing module. Although the roles of administrators and end-users can sometimes overlap (e.g., an administrator also happens to be an insurance agent), they are typically different users.

In the example shown, policy server 206 maintains, as a part of its policy questions processing module, two types of data used for storing and displaying relevant questions to the end-user: question sets and answer containers. Certain administrators have access to configuration code that allows them to directly alter the policy questions processing module (e.g., create and modify the question sets and answer containers), while the end-users only have access to user interfaces provided by the policy configuration code that allow them to modify specific policies (e.g., create and modify specific data relating to policies they are working on, answering questions, etc.).

Figure 3:
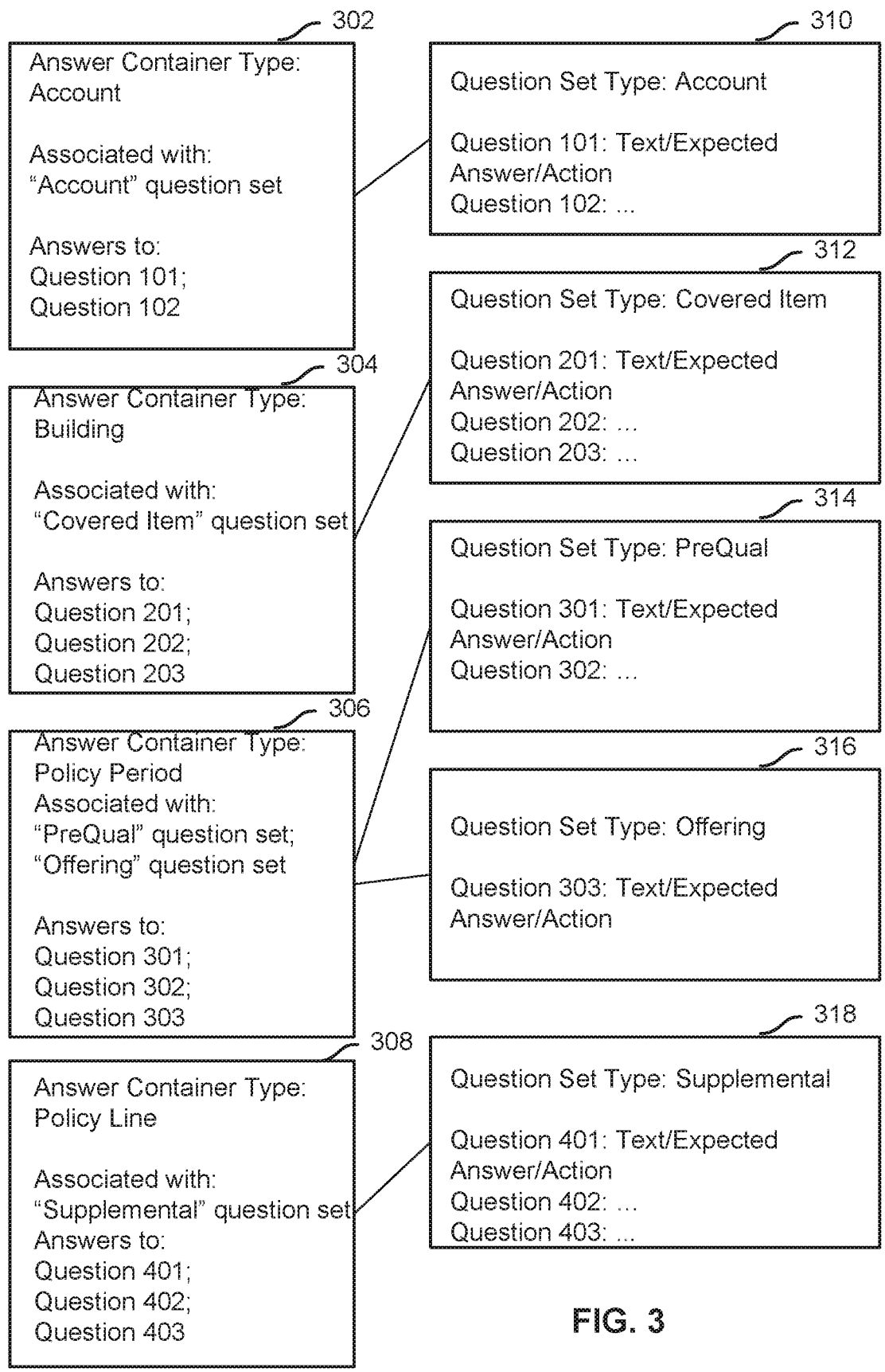
FIG. 3 is a functional diagram illustrating data structure examples of question sets and answer containers.

FIG. 3 is a functional diagram illustrating data structure examples of question sets and answer containers. As shown in this example, each instance of an answer container is used to store a set of answers to a corresponding set of questions. Separate instances of answer containers are created for different entities associated with a policy (e.g., an account, an item to be insured, a policy period, a policy line, a policy location, etc.). An answer container is implemented as an object the type of which is referred to as answer container type and is used for identification purposes. (e.g., "Account" answer container 302, "Building" answer container 304, "Policy Period" answer container 306, "Policy Line" answer container 308, "Policy Location" answer container (not shown), etc.). An answer container is associated with one or more question sets via answer container type identifier. For example, "Account" answer container 302 is associated with "Account" question set 310; "Building" answer container 304 is associated with "Covered Item" question set 312; "Policy Period" answer container 306 is associated with "PreQual" question set 314 and "Offering" question set 316; and "Policy Line" answer container 308 is associated with "Supplemental" question set 318. Many other answer container/question set associations are possible. An answer container includes an array of answers to questions in the associated question sets. In some embodiments, the answer container and answers are stored in database tables.

In some embodiments, an answer container can be an administrator-configured answer container (e.g., an answer container configured by the administrator via a set of configuration interfaces and logic) or a system-configured answer container (e.g., an answer container preconfigured automatically by the system as a part of default settings specified by the system vendor). In the example shown, the "Account" and "Building" answer containers are administrator-configured, and the remaining answer containers are system-configured.

In the example shown, a question set stores a set of questions that relate to a certain aspect of the policy configuration process or the policy itself. Each question set is also implemented as an object. In addition to associated answer container type, a question set also defines an associated question set type which can take on one of the values from a list of defined available question set types. Each question set includes an array of questions, which in turn are objects that specify the text of the questions, the expected answers, what actions to take if the end-users' answers do not match the expected answers, and/or any other appropriate properties associated with questions. In this example, a question set is associated with no more than one answer container, since the end-user should not have to answer the same set of questions more than once. Multiple question set types can be associated with a single answer container. In some implementations, multiple question sets of different question set types can declare the same associated answer container type.

In the following examples, insurance policies are derived from and related to a policy product. A policy product defines the attributes and shared data for its derived policies. In some embodiments, a policy product model is used to organize and specify metadata that defines the structure of a plurality of derived policies, and a data model is used to organize and store specific data pertaining to the derived policies. The question sets, which specify which questions are associated with a particular aspect of the product model, are associated with elements in the policy product model. The answer containers, which store actual answers to the relevant questions, are associated with entities in the data model.

Figure 4:
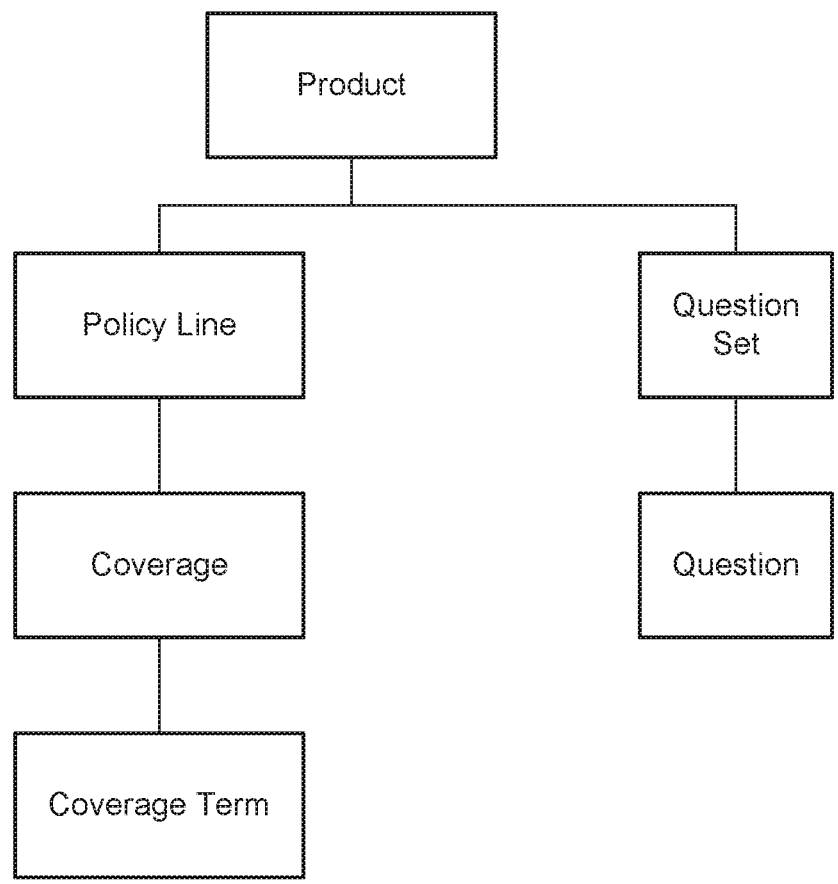
FIG. 4 is a functional diagram illustrating an embodiment of a product model that includes question sets.

FIG. 4 is a functional diagram illustrating an embodiment of a product model that includes question sets. In this example, the product model is a hierarchical tree that defines various elements of a product. A question set is a part of the product model, and a question is a sub-element of a question set. When a product is configured, elements in the product model are instantiated and stored.

Figure 5:
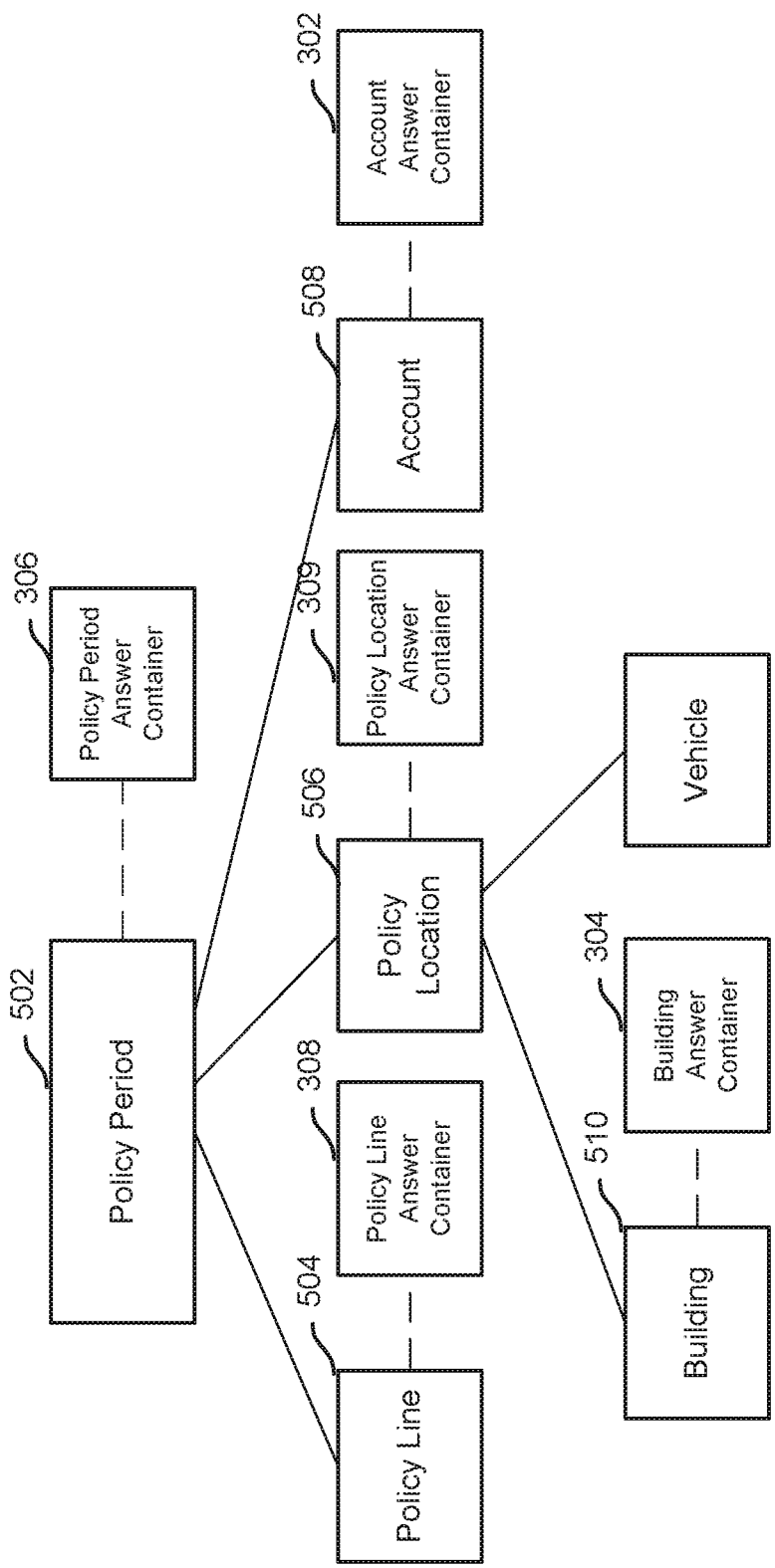
FIG. 5 is a functional diagram illustrating an embodiment of a data model that includes answer containers.

FIG. 5 is a functional diagram illustrating an embodiment of a data model that includes answer containers. In this example, the data model is a hierarchical tree structure. Answer containers are associated with individual entities in the data model. As shown, the top level includes an "Account" entity that stores account information (e.g., contact information). Associated with the "Account" entity is an "Account" answer container 302. The next level includes a "Policy" entity that stores policy information and that is associated with a "Policy" answer container. The next level includes a "Policy Period" entity that stores policy period related information such as effective dates. Associated with the "Policy Period" entity 502 is a "Policy Period" answer container 306. Similarly, entities such as "Policy Line" 504 and "Policy Location" 506 are associated with "Policy Line" answer container 308 and "Policy Location" answer container 309, respectively. As will be described in greater detail below, answer containers can be created and configured by the administrator. For example, while the diagram shows that no answer container is associated with the "Vehicle" entity, one can be created by the administrator and added to the data model.

Figure 6:
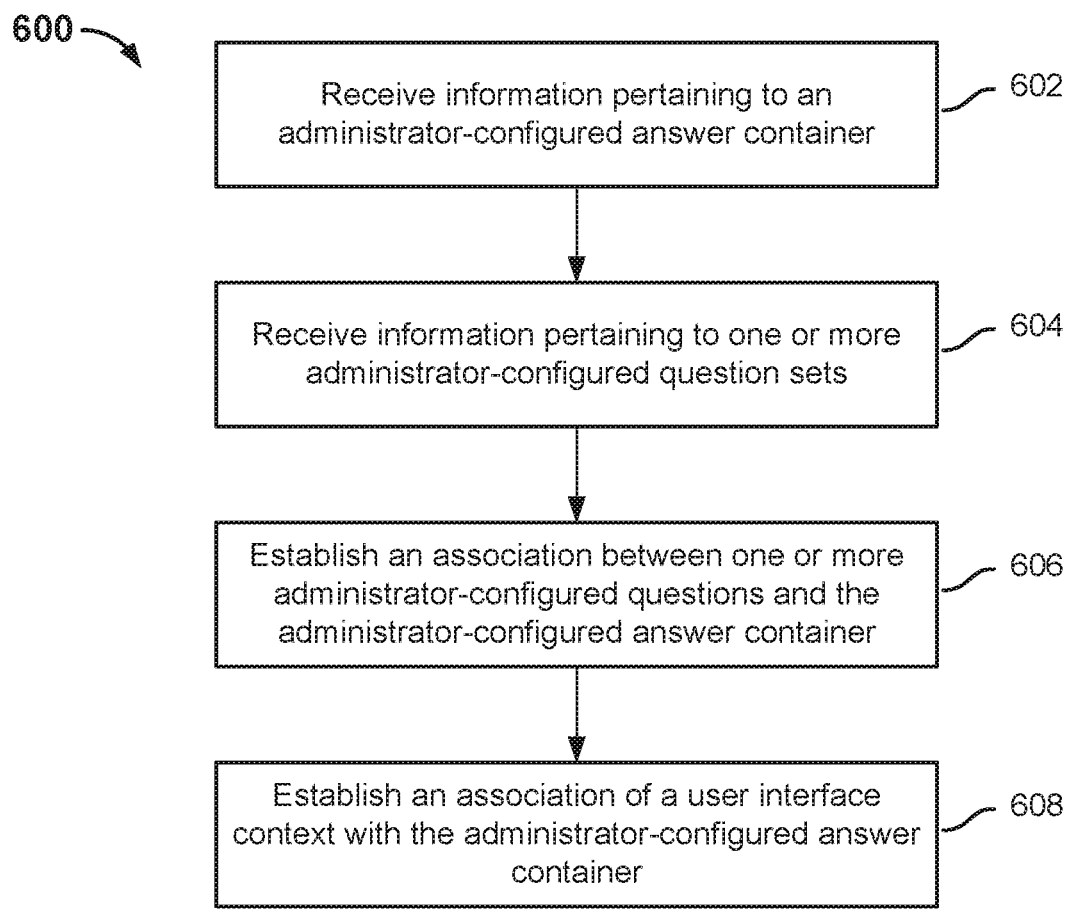
FIG. 6 is a flowchart illustrating an embodiment of a process for configuring answer containers and question sets.

FIG. 6 is a flowchart illustrating an embodiment of a process for configuring answer containers and question sets. Process 600 may be implemented on a system such as 100 or 200.

At 602, information pertaining to one or more answer containers is received and optionally stored. The received information can include administrator-configured answer containers. In some embodiments, the information is received via a communications interface. In various embodiments, instances of answer containers are established at the start time programmatically or as specified by an administrator. The properties associated with the answer containers can be derived programmatically, or configured by the administrator by manipulating objects via a graphical user interface, by editing program code or configuration documents, or any other appropriate techniques.

At 604, information pertaining to one or more sets of questions specified by the administrator is received and optionally stored. In some embodiments, the information is received via a communications interface. For example, an administrator can create an answer container for storing answers to account related questions. Accordingly, information pertaining to the "account" answer container is received and saved by the server. At this point, the set of account related questions are not yet specified; therefore, the answer container is not associated with any question sets. To make such an association, the administrator can specify the set of questions. The questions can be configured by manipulating objects via a graphical user interface, by editing program code or XML configuration documents, or the like. For example, the administrator may create a question set that includes account related questions such as "have you ever been convicted of driving under influence?" "have you received a moving violation in the past 18 months?", or an "insured item" question set that includes questions such as "has the insured item ever been damaged in an accident?" Identifiers for the questions and other properties of the questions are also specified. In some embodiments, additional information for the questions, such as the availability of the questions, expected answers, what actions to take if the customer supplied answer does not match the expected answer are also configured. Example user interfaces for question set configuration are described in greater detail in FIGS. 10-12.

Once the question sets are configured, associations between the question sets and the answer containers can be specified by the administrator and established by the system. For example, via an answer container configuration interface for the "Account" answer container, the administrator can indicate that the "Account" answer container is associated with the "Account" question set by selecting the appropriate one among several existing question sets (e.g., "Account," "Insured Item," "Pre-Qualification," "Supplemental," etc.); alternatively, via a question set configuration interface, the administrator can indicate that the "Account" question set is associated with the "Account" answer container by selecting the "Account" answer container from several existing answer containers (e.g., "Account," "Policy Period," "Policy Line," "Insured Item," etc.). Other implementations such as listing answer containers and question sets and allowing the administrator to connect each answer container with its respective question set(s) is used in other embodiments.

Once the user configuration is saved and received by the system, at 606, an association is established between the set of administrator-configured questions, administrator-configured answer object, and the administrator-configured answer container. In various embodiments, pointers, references, identifiers, tables, database entries or other appropriate techniques can be used to establish the association.

At 607, information pertaining to answers is received and optionally stored. The answers are correct or desired answers to question sets associated with the answer container. In some embodiments, the answers are configured as answer objects stored within the answer containers.

At 608, an association of a user interface context with the administrator-configured answer container is established, such that the sets of administrator-configured questions are also associated with the user interface context. As used herein, the user interface context refers to information that specifies which data should be presented to the end-user, and how the data should be rendered. In some embodiments, a unique identifier is associated with each user interface context. Depending on implementation, the administrator can be allowed to configure the association via scripts, command line tools, configuration files, as well as graphic user interfaces. The association is established by the system using references, pointers, mapping tables, database entries, or any other appropriate techniques. For example, the administrator may indicate that when an end-user is entering policy period related questions (e.g., the effective period of the policy), the user interface context for the policy period related user interface is associated with the "Policy Period" answer container; when an end-user is entering account related questions, the user interface context for the account related user interface is associated with the "Account" answer container; and so on.

Any question set that was previously configured to be associated with the answer container is also associated with the user interface context. For example, if "PreQual" and "Offering" are question sets configured to be associated with the "Policy Period" answer container, then they are also associated with the policy period related user interface context; if the "Account" question set is configured to be associated with the "Account" answer container, the "Account" question set is also associated with the account related user interface context. Since the user interface context is indirectly associated with the question set, when configuring the question set, the administrator does not need to specify to which user interface context the question sets applies or how the questions should be rendered for each question set. Instead, when configuring the user interface context, the administrator can specify that for a particular answer container, which ones of the question sets associated to that answer container should be shown. For example, all applicable question sets can be shown; question sets of a specific question set type can be shown; or specific question sets (e.g., identified using their unique identifiers) can be shown.

Process 600 may be repeated to configure multiple administrator-configured answer containers, answers, and question sets, establish their associations with each other, and establish the associations of answer containers with user interface contexts.

Figure 7:
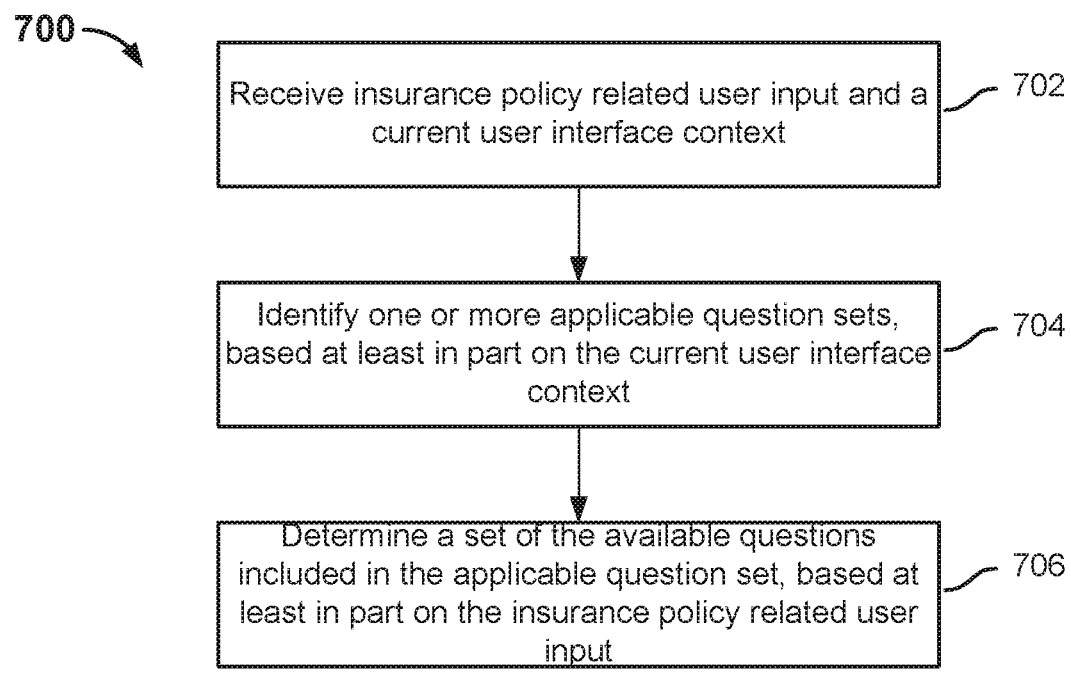
FIG. 7 is a flowchart illustrating an embodiment of a process for processing insurance related information, where appropriate question sets are displayed to the end-user.

FIG. 7 is a flowchart illustrating an embodiment of a process for processing insurance related information, where appropriate question sets are displayed to the end-user. Process 700 may be implemented on a system such as 100 or 200.

At 702, insurance policy related user input and a current user interface context are received. In some embodiments, the end-user (e.g., the insurance agent or the customer himself) inputs information about the policy owner, policy options, etc., via a user interface (such as a visual or an audio interface) provided on the client. Examples of information input by the end-user include the location and condition of a property to be insured, the effective period for the policy, coverages and options, etc. The end-user input is received at the policy server via a communications interface. The current user interface context includes information that indicates which part of the information gathering process is currently under execution. As described above in connection with process 600, each user interface context is preconfigured by an administrator to be associated with a corresponding answer container.

At 704, based at least in part on the current user interface context, one or more applicable question sets are identified. In some embodiments, the appropriate answer container that corresponds to the current user interface context is identified first, and the question sets previously configured to be associated with the answer container are subsequently identified as the applicable question sets. For example, when the end-user selects the user interface for providing policy period related information about the policy, the policy period related user interface context was configured to be associated with a "Policy Period" answer container, which was in turn configured to be associated with the "PreQual" and the "Offering" question sets. Thus, the "PreQual" and the "Offering" question sets are determined to be applicable. Further level of granularity of association is possible based on question set type (e.g., display only question sets of offering type on a current page) or a unique identifier of a question set. As another example, when the user is providing information about a building that is covered, the building configuration user interface context is associated with the "Building" answer container, which is configured to be associated with the "Covered Item" question set.

At 706, based at least in part on the insurance policy related user input, a set of available questions included in the applicable question set is determined.

In some embodiments, the determination of available questions is made possible by a mapping of certain attributes and corresponding availability indicators of questions that correspond to different combinations of the attributes. Table 1 illustrates an example of such a mapping for a question set. As shown, the first column lists identifiers of questions in the question set; the second column lists the states in which the question is available; the third column lists the time periods for which the questions are available; and the fourth column lists availability indicators for the questions. The second and the third columns can be viewed as availability criteria. Depending on the corresponding availability indicator, a question is only available (or unavailable) if the received information matches the filtering criteria. The "*" symbol represents a wildcard value, indicating that the particular filtering criteria does not apply. In this example, Question 1 is available if the risk unit is located in Arizona, California, or Nevada, and the policy's effective period falls within 6/1/2012-9/10/2012; Question 2 is available in California only, but there is no restriction on the effective period; Question 3 is available universally; Question 4 is unavailable only for policies with effective period starts on or after 2/1/2013. The availability configuration of Table 1 is shown for purposes of illustration only. Other techniques for indicating the availabilities of questions can be used in other embodiments.

TABLE 1

| Question ID | State | Effective Period | Availability Indicator |
| --- | --- | --- | --- |
| Question 1 | AZ, CA, NV | Jun. 1, 2012-Sep. 10, 2012 | Available |
| Question 2 | CA | * | Available |
| Question 3 | * | * | Available |
| Question 4 | * | Feb. 1, 2013- | Unavailable |

Figure 8:
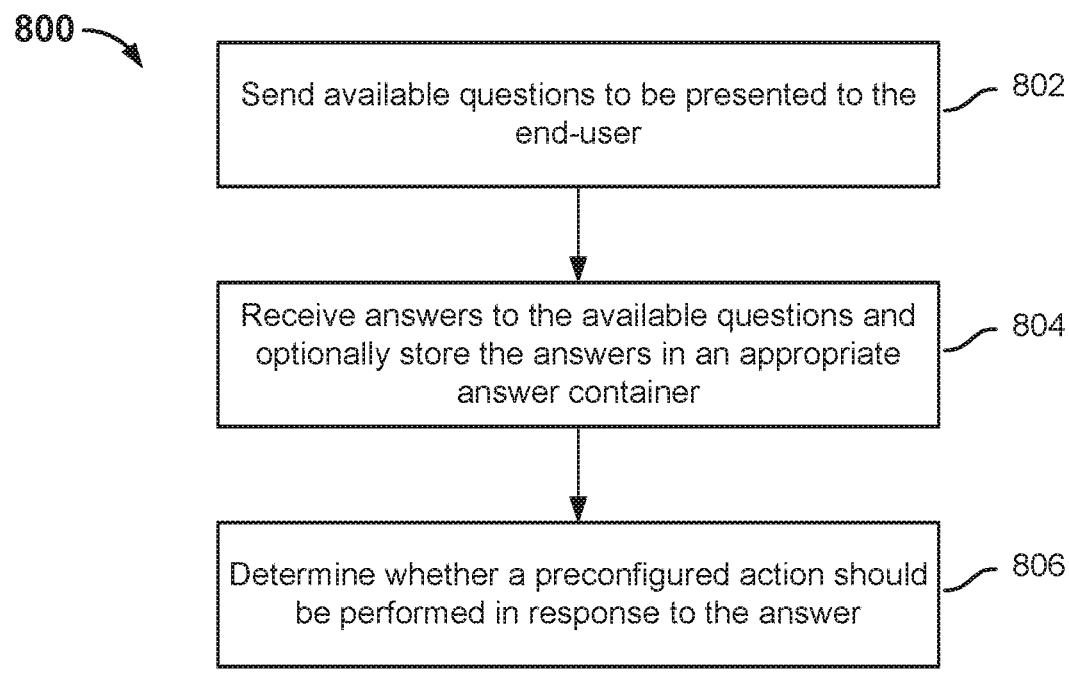
FIG. 8 is a flowchart illustrating an embodiment of a process for determining whether to perform certain actions in response to answers received.

In another aspect, each question in the question set is configured to correspond to an associated action. FIG. 8 is a flowchart illustrating an embodiment of a process for determining whether to perform certain actions in response to answers received. Process 800 can be implemented on a system such as 100 or 200. In some embodiments, process 800 follows process 700.

At 802, the available questions are sent (e.g., to a display interface), and presented to the end-user. In some embodiments, how the questions are rendered depends on the current user interface context.

At 804, answers to the available questions are received from the end-user. In some embodiments, the actual answers are stored in the appropriate answer container.

In some embodiments, each question is preconfigured with an associated action. At 806, it is determined whether a preconfigured action should be performed in response to the answer. In some embodiments, a question has a preconfigured, expected answer. When an answer is received from the user, it is compared with the expected answer. In some embodiments, if the received answer does not match the expected answer, the preconfigured action is performed; in some embodiments, if the received answer matches the expected answer, the preconfigured action is performed.

Various appropriate actions can be preconfigured. For example, in some systems, issues relating to underwriting are created as underwriting issues, and the policy could be prevented from being quoted, bound, or issued until certain underwriting issues are resolved. In some embodiments, the preconfigured action includes blocking the end-user from proceeding; in other words, the user is prevented from going to the next tab or page to enter any additional data and continue with the policy configuration process. In some embodiments, the preconfigured action includes displaying a warning but the end-user is allowed to proceed. Additional actions are configurable by the administrator. A combination of the actions can be performed.

For example, a question such as "is hazardous materials stored at this location" is configured with an expected answer of "no," and the preconfigured action is "blocking the end-user from proceeding" since the insurance carrier does not wish to underwrite such a policy. If a received answer to the question is "yes," the end-user would be blocked on this page, and is not allowed to proceed.

In some cases, when the end-user recognizes that he has supplied an unexpected answer, he may revise the answer. Whether the revision is due to actual changes (e.g., the potential insured decides to stop storing hazardous materials on-site) or merely to get around being blocked from obtaining a policy, such a revision might be of interest to the carrier. Accordingly, in some embodiments, the information is tracked (e.g., stored in a log or a database), so that underwriters can investigate the issue if needed.

Figure 9:
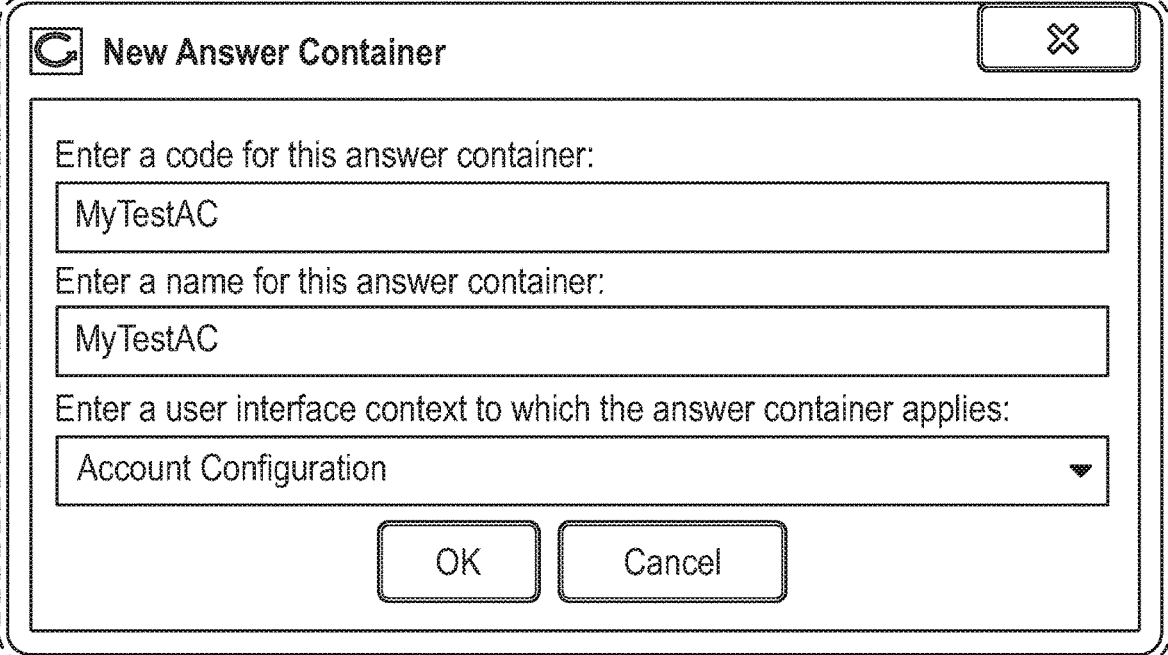
FIGS. 9-10 are functional diagrams illustrating example user interface displays used to configure a question set.
Figure 10:
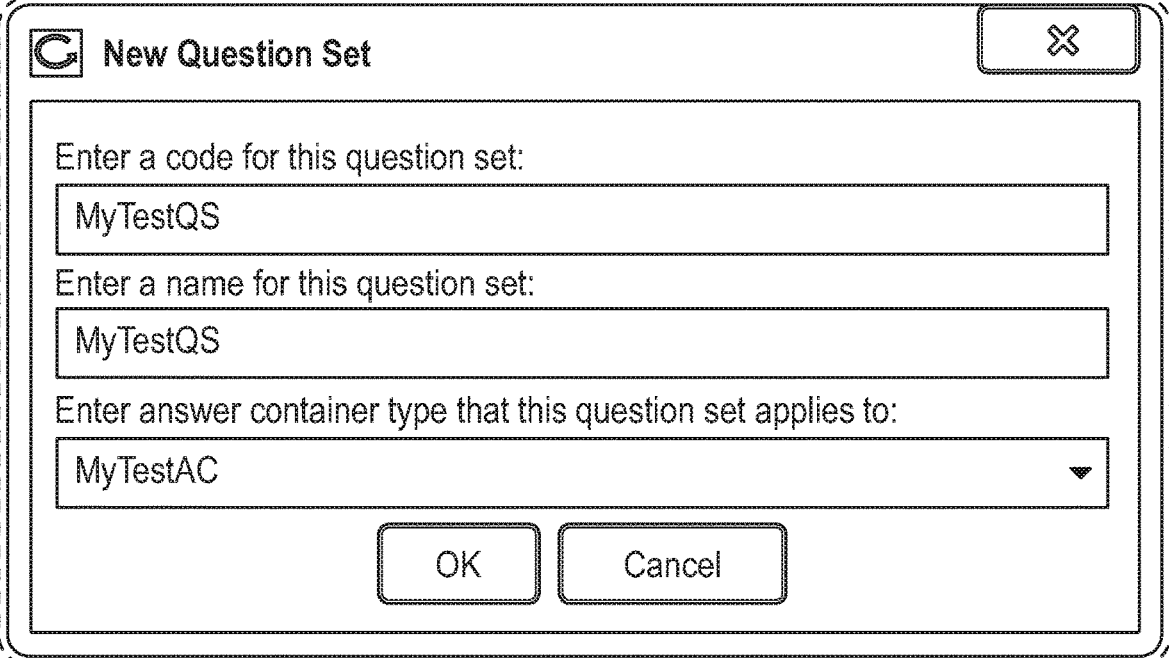

FIGS. 9-10 are functional diagrams illustrating example user interface displays used to configure a question set.

FIG. 9 shows the creation of a new answer container. The user interface presents text boxes for entering a code and a name for the answer container. It also presents a drop-down box that lists all available user interface context, from which the administrator can select a desired user interface context to be associated with the new answer container. Alternatively, the answer containers can be configured via editing configuration files such as XML documents.

FIG. 10 shows the creation of a new question set. The user interface presents text boxes for entering a code and a name for the question set. It also presents a drop-down box that lists all the existing answer containers, from which the administrator can select a desired answer container to be associated with the new question set.

Figure 11:
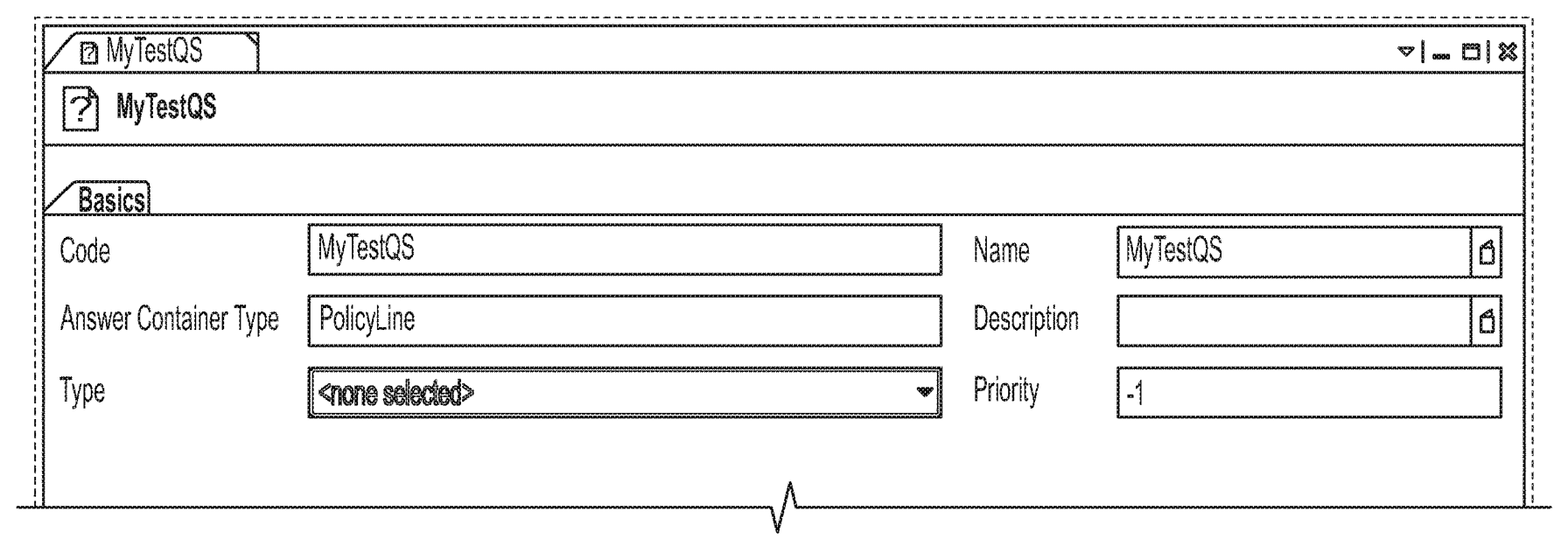

FIG. 11 shows the basic configuration options of a new question set. In this example, the "Type" field is used to configure the question set type property, and its value is drawn from administrator configured list of question set types. The "Priority" field is used to determine the relative order in which question sets are evaluated and shown in the user interface (e.g., a question set with a priority of 1 will appear on the page above a question set of priority 5).

Figure 12:
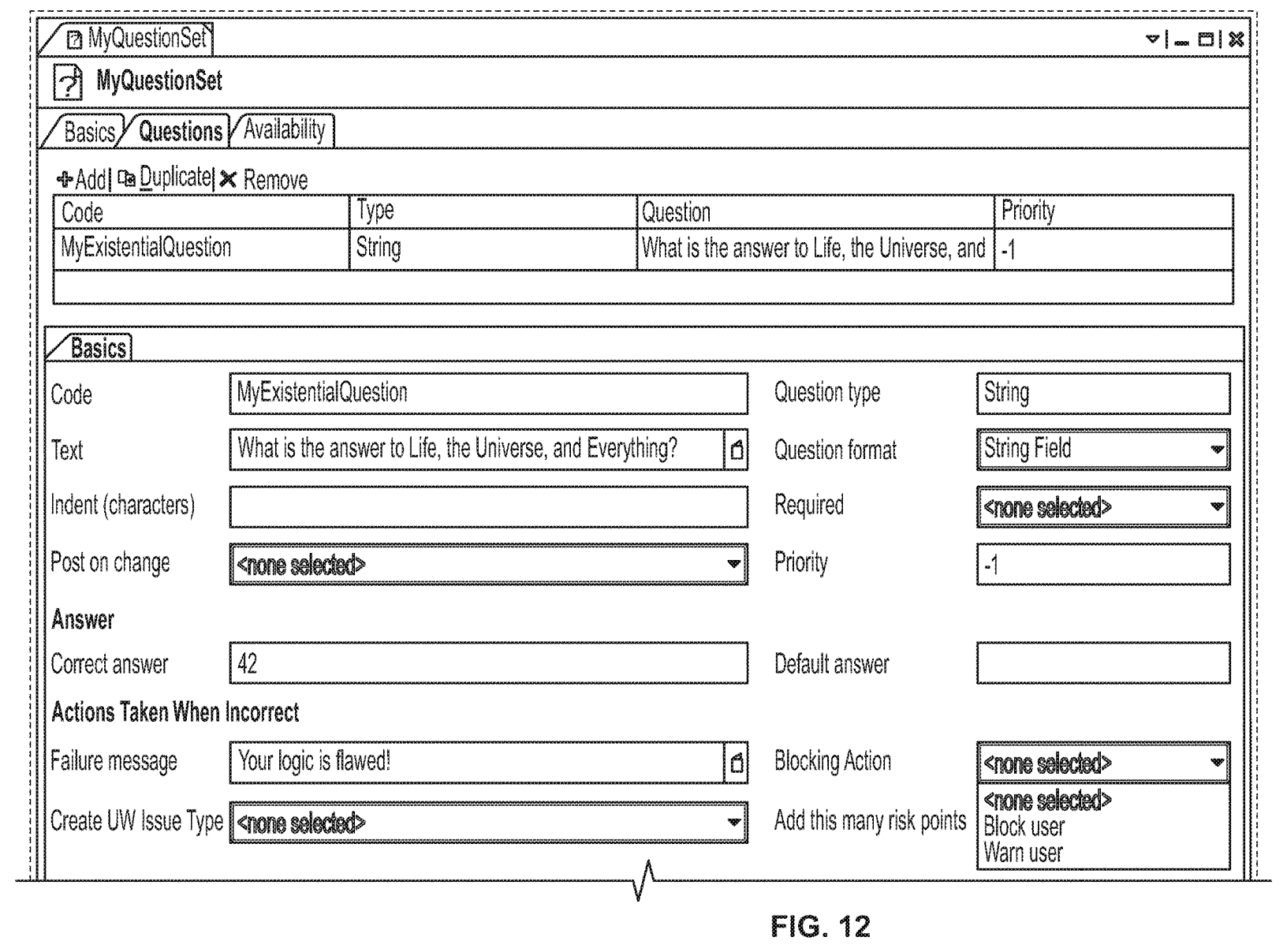

FIG. 12 shows the basic configuration options for a question in the question set. In this example, the "questions" configuration tab is a part of configuration screens for configuring a question set. In the diagram shown, text boxes are used to enter the text and the correct answer. A drop-down box lists the possible actions to take when the actual received answer does not match the correct answer.

The above user interface diagrams are for purposes of example only, and many different configurations and options can be used in other embodiments.

Managing insurance policy configuration has been described. By allowing administrators to configure answer containers, answers, and question sets, and make associations with user interface contexts, insurance policy related questions can be more easily generated and displayed within appropriate contexts.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    one or more non-transitory memories coupled with one or more hardware processors, wherein the one or more non-transitory memories are configured to provide the one or more hardware processors with instructions which when executed cause the one or more hardware processors to:
        receive information pertaining to one or more administrator-configured answer containers, wherein an administrator-configured answer container comprises an array configured to store a set of answers to a set of questions in an associated administrator-configured question set, and the information pertaining to one or more administrator-configured answer containers comprising an indication of a user interface context with which the one or more administrator-configured answer containers are to be associated;
        establish separate instances of administrator-configured answer containers for different entities associated with an insurance policy, the different entities comprising two or more of: an account, an item to be insured, a policy period, a policy line, and a policy location;
        receive information pertaining to one or more administrator-configured question sets, wherein an administrator-configured question set is configured to store a set of questions related to a particular aspect of at least one of a policy configuration process and the insurance policy;
        establish an association between an administrator-configured question set and an administrator-configured answer container such that answers to questions in the administrator-configured question set are stored to the administrator-configured answer container with which the association has been established, the association between the administrator-configured question set and an administrator-configured answer container being based at least in part on the information pertaining to one or more administrator-configured question sets that is received;
        establish an association between the user interface context and the administrator-configured answer container, such that the set of administrator-configured questions is also associated with the user interface context, the association between the user interface context and the administrator-configured answer container being based at least in part on the information pertaining to one or more administrator-configured answer containers comprising an indication of a user interface context with which the one or more administrator-configured answer containers are to be associated that is received;
        provide a user interface with which a user interacts to input information pertaining to the insurance policy, wherein the user interface provides at least a part of the administrator-configured question set, the information pertaining to the insurance policy being associated with the at least the part of the administrator-configured question set, and a corresponding user interface context being determined based at least in part on the administrator-configured question set, and the information pertaining to the insurance policy;
        receive the information pertaining to the insurance policy that is input to the user interface;
        in response to receiving the information pertaining to the insurance policy, determine whether to perform a preconfigured action in response to the answer; and
        in response to determining that the preconfigured action is to be performed, perform the preconfigured action, wherein the preconfigured action includes blocking an end-user from proceeding to another page of the user interface.

2. The system of claim 1, wherein the administrator-configured answer container corresponds to a database table.

3. The system of claim 1, wherein the one or more non-transitory memories are further configured to provide the one or more hardware processors with instructions which when executed cause the one or more hardware processors to:
    receive a current user interface context in connection with the information pertaining to the insurance policy;
    determine, based at least in part on the current user interface context, an applicable question set; and
    determine, based at least in part on the information pertaining to the insurance policy, availability of each question in the applicable question set.

4. The system of claim 3, wherein determining the applicable question set includes:
    identifying a corresponding answer container associated with the current user interface context; and
    identifying a corresponding question set associated with the corresponding answer container as the applicable question set.

5. The system of claim 3, wherein to receive the information pertaining to the insurance policy that is input to the user interface comprises:
    receive an answer to an available question.

6. The system of claim 1, wherein the preconfigured action further includes generating a warning and providing the warning on the user interface.

7. The system of claim 5, wherein the one or more non-transitory memories are further configured to provide the one or more hardware processors with instructions which when executed cause the one or more hardware processors to:

detect that the answer to the available question has been changed; and record information indicating that the answer to the available question has been changed.

8. The system of claim 1, wherein the administrator-configured answer container is created within a data model, and the administrator-configured question set is created within a product model.

9. A method, comprising:

receiving information pertaining to one or more administrator-configured answer containers, wherein an administrator-configured answer container comprises an array configured to store a set of answers to a set of questions in an associated administrator-configured question set, and the information pertaining to one or more administrator-configured answer containers comprising an indication of a user interface context with which the one or more administrator-configured answer containers are to be associated;

establishing separate instances of administrator-configured answer containers for different entities associated with an insurance policy, the different entities comprising two or more of: an account, an item to be insured, a policy period, a policy line, and a policy location;

receiving information pertaining to one or more administrator-configured question sets, wherein an administrator-configured question set is configured to store a set of questions related to a particular aspect of at least one of a policy configuration process and the insurance policy;

establishing, using a processor, an association between an administrator-configured question set and an administrator-configured answer container such that answers to questions in the administrator-configured question set are stored to the administrator-configured answer container with which the association has been established, the association between the administrator-configured question set and an administrator-configured answer container being based at least in part on the information pertaining to one or more administrator-configured question sets that is received;

establishing an association between a user the user interface context and the administrator-configured answer container, such that the set of administrator-configured questions is also associated with the user interface context, the association between the user interface context and the administrator-configured answer container being based at least in part on the information pertaining to one or more administrator-configured answer containers comprising an indication of a user interface context with which the one or more administrator-configured answer containers are to be associated that is received;

providing a user interface with which a user interacts inputs information pertaining to the insurance policy, wherein the user interface provides at least a part of the administrator-configured question set, the information pertaining to the insurance policy being associated with the at least the part of the administrator-configured question set, and a corresponding user interface context being determined based at least in part on the administrator-configured question set, and the information pertaining to the insurance policy;

receiving the information pertaining to the insurance policy that is input to the user interface;

in response to receiving the information pertaining to the insurance policy, determining whether to perform a preconfigured action in response to the answer; and in response to determining that the preconfigured action is to be performed, perform the preconfigured action, wherein the preconfigured action includes blocking an end-user from proceeding to another page of the user interface.

10. The method of claim 9, wherein the administrator-configured answer container corresponds to a database table.

11. The method of claim 9, further comprising:

receiving a current user interface context in connection with the information pertaining to the insurance policy;

determining, based at least in part on the current user interface context, an applicable question set; and determining, based at least in part on the information pertaining to the insurance policy, availability of each question in the applicable question set.

12. The method of claim 11, wherein determining the applicable question set includes:

identifying a corresponding answer container associated with the current user interface context; and identifying a corresponding question set associated with the corresponding answer container as the applicable question set.

13. The method of claim 11, wherein receive the information pertaining to the insurance policy that is input to the user interface comprises:

receiving an answer to an available question.

14. The method of claim 9, wherein the preconfigured action further includes one or more of: creating an underwriting issue; assigning a risk value; and generating a warning and providing the warning on the user interface.

15. The method of claim 13, further comprising detecting that the answer to the available question has been changed.

16. The method of claim 9, wherein the administrator-configured answer container is created within a data model, and the administrator-configured question set is created within a product model.

17. A computer program product, the computer program product being embodied in a tangible non-transitory computer readable storage medium and comprising computer instructions for:

receiving information pertaining to one or more administrator-configured answer containers, wherein an administrator-configured answer container comprises an array configured to store a set of answers to a set of questions in an associated administrator-configured question set, and the information pertaining to one or more administrator-configured answer containers comprising an indication of a user interface context with which the one or more administrator-configured answer containers are to be associated;

establishing separate instances of administrator-configured answer containers for different entities associated with an insurance policy, the different entities comprising two or more of: an account, an item to be insured, a policy period, a policy line, and a policy location;

receiving information pertaining to one or more administrator-configured question sets wherein an administrator-configured question set is configured to store a set of questions related to a particular aspect of at least one of a policy configuration process and the insurance policy;

establishing an association between an administrator-configured question set and an administrator-configured answer container such that answers to questions in the administrator-configured question set are stored to the administrator-configured answer container with which the association has been established, the association between the administrator-configured question set and an administrator-configured answer container being based at least in part on the information pertaining to one or more administrator-configured question sets that is received;

establishing an association between the user interface context and the administrator-configured answer container, such that the set of administrator-configured questions is also associated with the user interface context, the association between the user interface context and the administrator-configured answer container being based at least in part on the information pertaining to one or more administrator-configured answer containers comprising an indication of a user interface context with which the one or more administrator-configured answer containers are to be associated that is received;

providing a user interface with which a user interacts inputs information pertaining to the insurance policy, wherein the user interface provides at least a part of the administrator-configured question set, the information pertaining to the insurance policy being associated with the at least the part of the administrator-configured question set, and a corresponding user interface context being determined based at least at least in part on the part of the administrator-configured question set, and the information pertaining to the insurance policy;

receiving the information pertaining to the insurance policy that is input to the user interface;

in response to receiving the information pertaining to the insurance policy, determining whether to perform a preconfigured action in response to the answer; and in response to determining that the preconfigured action is to be performed, performing the preconfigured action, wherein the preconfigured action includes blocking an end-user from proceeding to another page of the user interface.

18. The system of claim 1, wherein the one or more non-transitory memories are configured to provide the one or more hardware processors with instructions which when executed cause the one or more hardware processors to establish the association between the administrator-configured question set and the administrator-configured answer container at least in part by using at least one of: a pointer, a reference, an identifier, a table, and a database entry.

19. The system of claim 18, wherein the identifier comprises an answer container type identifier.

20. The system of claim 1, wherein to provide the user interface with which the user interacts to input the information pertaining to the insurance policy comprises:

present, in a display interface, a question in the set of administrator-configured questions, wherein rendering of the question is based at least in part on the user interface context associated with the set of administrator-configured questions; and to receive the information pertaining to the insurance policy that is input to the user interface comprises:

receive, via the display interface, an answer to the question presented in the display interface; and store the answer received via the display interface in the administrator-configured answer container, wherein storing of the received answer in the administrator-configured answer container is based at least in part on the association established between the user interface context and the administrator-configured answer container.

21. The system of claim 1, wherein the information pertaining to one or more administrator-configured answer containers and the information pertaining to one or more administrator-configured question sets are received from an administrator associated with a privilege to make modifications to at least part of an insurance policy underwriting and administration platform, and are received via implementation of configuration code for modifying a policy questions processing module.

22. The system of claim 1, wherein the information pertaining to one or more administrator-configured question sets comprises an attribute for an availability criteria for at least part of the set of questions.

* * * * *